United States Patent [19]
Colman et al.

[11] Patent Number: 5,973,219
[45] Date of Patent: Oct. 26, 1999

[54] ISOBUTENE POLYMERIZATION PROCESS

[75] Inventors: Derek Alan Colman, Fleet; James Maxwell Kerr, Edinburgh, both of United Kingdom

[73] Assignee: BP Chemicals Limited, London, United Kingdom

[21] Appl. No.: 09/048,270

[22] Filed: Mar. 26, 1998

[30] Foreign Application Priority Data

Apr. 8, 1997 [GB] United Kingdom .................... 9707075

[51] Int. Cl.⁶ ................ C07C 2/02; C07C 2/04; C08F 2/00; C08F 4/00
[52] U.S. Cl. .................... 585/525; 585/510; 526/86; 526/209; 526/210; 526/237
[58] Field of Search .................... 585/525, 510; 526/86, 209, 210, 237

[56] References Cited

U.S. PATENT DOCUMENTS 4,605,808  8/1986  Samson ................................. 585/525
5,068,490  11/1991 Eaton ..................................... 585/525

FOREIGN PATENT DOCUMENTS 0 628 575 A1  12/1994  European Pat. Off. .
4033 196 C1   4/1992   Germany .

*Primary Examiner*—Glenn Caldarola
*Assistant Examiner*—In Suk Bullock
*Attorney, Agent, or Firm*—Nixon & Vanderhye

[57] ABSTRACT

A process for controlling the molecular weight distribution of polyisobutene formed during a liquid phase polymersiation reaction using a catalyst comprising boron trifluoride and taking place in a reactor having condensers associated with it which process involves introducing an electron donor above the level of liquid in the reactor to minimize the reaction of isobutene with free gaseous boron trifluoride in the condensers thereby minimizing the formation of unwanted polymers.

13 Claims, 3 Drawing Sheets

ISOBUTENE POLYMERIZATION PROCESS

This invention relates to an improved method of producing polyisobutenes by cationic polymerisation of an isobutene containing feedstock when using boron trifluoride based catalyst systems and a boiling liquid reactor system.

Methods of polymerising isobutene, whether pure or in an isomeric mixture as in a C4 raffinate stream, using Lewis Acid catalysts are well known and disclosed extensively in prior art. Typical of such catalysts are the halides of aluminium, iron, titanium, tin, mercury and boron. These catalysts can be optionally used in conjunction with co-catalysts such as water, alcohols, ethers, organic acids, mineral acids and alkyl halides to enhance catalyst activity. The polymerisation reaction is typically carried out in the liquid phase, batchwise or continuously, at temperatures ranging from −100° C. to +100° C.

It is also well known that the chain termination step during the polymerisation of isobutene using the aforementioned catalyst systems generally results in a "final" double bond which imparts a degree of reactivity to the polymer for subsequent functionalisation reactions, such as epoxidation to form the corresponding epoxide or an ene addition reaction with maleic anhydride to form the corresponding polyisobutenyl succinic anhydride. However, the termination step, if not properly controlled, can result in the final double bond being located either in a relatively less reactive internal position such as 1,2,2-trisubstituted position or in the more desirable, highly reactive terminal 1,1-disubstituted position (hereafter "terminal vinylidene" group) as shown below in each of which R is an alkyl group;

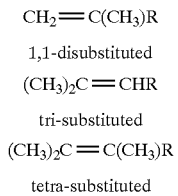

$$CH_2 = C(CH_3)R$$
1,1-disubstituted $$(CH_3)_2C = CHR$$
tri-substituted $$(CH_3)_2C = C(CH_3)R$$
tetra-substituted In view of the above, it has long been the objective of research in this field to improve the reactivity of the polyisobutene by identifying catalysts capable of polymerising isobutene in such a way that the number of terminal vinylidene groups in the polyisobutene is maximised. To date, one of the most efficient catalysts identified for achieving this objective is boron trifluoride. Processes which use boron trifluoride are described for example in U.S. Pat. No. 4,605,808, U.S. Pat. No. 5,068,490, DE-A-4033196 and in EP-A-0628575. It should be noted that the overall catalyst system in these publications consists of boron trifluoride complexed with, for example, one or more alcohols or ethers and these complexes can either be preformed before being added to the reactor or prepared in-situ within the reactor.

One type of reactor typically used to manufacture polyisobutenes is a boiling liquid system. Generally the reactor contains a liquid polymerisation reaction medium which comprises hydrocarbon feedstock, polymer being formed and catalyst and which is boiling due to the exothermic nature of the polymerisation reaction, and a vapour space above this liquid polymerisation medium. The vapour space may comprise gases that are condensible. Generally these gases are condensed into liquid form on condenser(s). This type of reactor almost always has at least one condenser associated with it in order to achieve control of the reaction temperature and pressure. This condenser(s) is usually located at the top of the reactor or above the reactor and is connected to the reactor via one and or more pipes. The main purpose of the condenser(s) is to liquefy vaporised C4 monomers being generated in the reactor. The condensate containing liquefied C4 monomers may be returned to the reactor via a pipe or line located at the bottom of the condenser. One major disadvantage encountered with this reactor system, however, when using a boron trifluoride based catalyst system is that some gaseous boron trifluoride escapes from the bulk reaction liquid into the vapour phase and is carried up into the condenser(s) associated with the reactor (hereafter 'condenser(s)'). Once it is up in these condenser(s) it can catalyse the polymerisation of at least some of the condensing isobutene (and any other C4 olefin monomers present), resulting in the formation of unwanted polymer(s) in the condenser(s) which have a different molecular weight distribution to that desired and being made in the bulk reactor. The unwanted polymer formed in the condenser is subsequently returned (usually) to the reactor along with the unreacted condensed C4 monomers and gets mixed with the desired polymer which is made in the bulk reactor. The difference in the molecular weight of the polymers formed in the condenser and in the bulk reactor causes the molecular weight distribution of the total reactor polymer product (hereafter "dispersity index") to be significantly broader than it would be in the absence of the unwanted polymer from the condenser(s). This broadening of the dispersity index of the final product is undesirable since it results in both inconsistent product quality and, for example, a poorer final product molecular weight/viscosity relationship (i.e., the final product polymer has a higher viscosity for a given molecular weight than it would be in the absence of a contaminating polymer from the condenser).

It has now been found that by introducing an electron donor into the reactor above the level of the reaction liquid and, for example, by preventing free gaseous boron trifluoride reaching the condenser(s), it is possible to either substantially reduce or completely eliminate the formation of unwanted polymers in the condenser(s) and hence produce a product polymer of a narrow dispersity index.

Accordingly, the present invention is a process for controlling the dispersity index of polymers formed during a liquid phase cationic polymerisation of a hydrocarbon feedstock comprising isobutene in the presence of a catalyst comprising boron trifluoride in a liquid phase in a reactor having condensers associated therewith, said process comprising introducing above the level of liquid in the reactor an electron donor to minimise the reaction of isobutene with free gaseous boron trifluoride in the condensers thereby minimising the formation of unwanted polymers.

The hydrocarbon feedstock used as a source of isobutene can be pure isobutene or a C4 raffinate stream comprising isobutene. The amount of isobutene in the hydrocarbon feedstock is suitably at least 10% w/w, preferably at least 25% w/w. The hydrocarbon feedstock may additionally contain one or more alkanes or cycloalkanes. A typical feedstock is a butadiene raffinate stream (hereafter "Raffinate I") from a steam cracking process or from a fluid-catalytic cracking process after the selective separation of 1,3-butadiene. The hydrocarbon feedstock used as a source of isobutene may be a hydrocarbon stream obtained during the refining of crude oil comprising primarily of butanes and butenes from catalytic crackers (hereafter termed Refinery B—B). Some of these feedstock identifications can be found, for example, in a book entitled "C4-Hydrocarbons and Derivatives, Resources, Production, Marketing" by Schulze & Homann, published by Springer-Verlag (1989). Suitable compositions by weight of the total composition are shown in table 1.

TABLE 1

| Component | Raffinate I (%) | Refinery B-B (%) |
|---|---|---|
| Isobutane | 0–5 | 35–45 |
| n-Butane | 4–12 | 7–12 |
| Iso-butene | 35–55 | 10–20 |
| 1-Butene | 15–35 | 9–15 |
| cis/trans-2-Butene | 10–25 | 20–30 |
| 1,3-Butadiene | 0–0.5 | 0–0.5 |

Ideally, it would be desirable to completely prevent contact between free gaseous boron trifluoride catalyst and the isobutene present in the reactor condenser(s). This may be achieved by ensuring that the electron donor is suitably introduced above the reactor liquid level in an amount sufficient to distribute the donor over the surface of the condenser(s) as evenly as possible in order to counter-act the effect of any free gaseous boron trifluoride entering the condensers. Thus, the electron donor may be introduced above the reactor liquid level and distributed over the surface of the condenser(s). Thus, the electron donor could be added into the reactor anywhere above the reactor liquid level via one or more nozzles suitably in a liquid and/or in a vaporised state to facilitate even distribution of the donor on to the vulnerable parts, e.g. surface(s), of the condenser thereby minimising the catalytic activity of the boron trifluoride as it enters the condenser(s) and associated lines. To maximise the amount of electron donor reaching the vulnerable parts of the condenser, it is preferable to spray the electron donor into the reactor above the level of the reaction liquid through a sufficient number of nozzles. The nozzles suitably have a sufficiently small opening (aperture) to facilitate complete vaporisation of the electron donor prior to it reaching the condenser or control the droplets of the electron donor to a size such that all of the droplets are carried up into the condenser by rising vapours of the reactants and/or products above the reaction mixture. The electron donor is suitably added into the reactor in droplet and/or vapour form anywhere above the reaction liquid level. A feature of the invention is that addition of the electron donor in even the smallest amounts suppresses at least to a degree the formation of unwanted polymers which adversely affect the dispersity index of the final product from the bulk reaction. However, in order to inhibit substantially completely the formation of such unwanted polymers it is added in an amount of at least 2 moles of the electron donor per mole of free gaseous boron trifluoride expected to rise to the condensers and the associated pipe-work above the level of the liquid in the reactor, preferably at least 3 moles of the electron donor per mole of free, gaseous boron trifluoride expected to rise to the condensers and the associated pipe-work above the level of liquid in the reactor. The electron donor is introduced into the reactor through a nozzle such that the droplets and/or vapours thereof reach and fully envelop the surface of the condenser(s) and associated pipe work without itself condensing and dropping down into the bulk reaction liquid prior to reaching the condenser(s). Where the electron donor can have an adverse effect on the polymerisation reaction if returned with the condensate to the reactor, the electron donor can be used in a quantity small enough for this adverse effect to be tolerable.

Examples of the electron donors that may be used include inter alia one or more selected from (a) one or more of alcohols, especially primary alcohols and secondary alcohols suitably having 1–20 carbon atoms, particularly methanol, ethanol, propanol, butanol, isopropanol, 2-butanol, cyclohexanol, ether alcohols such as 2-methoxy ethanol; (b) one or more of straight, branched chain or cyclic ethers, suitably having 1–20 carbon atoms on each of the hydrocarbyl groups associated with such ethers, particularly alkyl tertiary-butyl ethers, such as methyl tertiary butyl ether, ethyl tertiary butyl ether, propyl tertiary butyl ether, butyl tertiary butyl ether, iso-propyl tertiary butyl ether or sec-butyl tertiary butyl ether; (c) one or more of esters, especially aliphatic esters; (d) one or more of acids, especially carboxylic acids such as acetic acid and propionic acid; (e) one or more of aldehydes; (f) one or more of ketones; (g) one or more of amines; (h) one or more of amides; (i) one or more of amino alcohols; and the like.

The process of the present invention is applicable to any catalyst system comprising boron trifluoride. Suitable catalyst systems are those which comprise boron trifluoride complexed with complexing agents such as primary and/or secondary alcohols and/or ethers. Particularly suitable alcohols are those having 1–20 carbon atoms, particularly methanol, ethanol, propanol, isopropanol, butanol, isobutanol and secbutanol. Suitable ethers are straight, branched chain or cyclic ethers, suitably having 1–20 carbon atoms on each of the hydrocarbyl groups associated with such ethers, particularly alkyl tertiary-butyl ethers, such as methyl tertiary butyl ether, ethyl tertiary butyl ether, propyl tertiary butyl ether, butyl tertiary butyl ether, iso-propyl tertiary butyl ether or sec-butyl tertiary butyl ether.

The boron trifluoride complex may be preformed or formed in situ, in the latter case the boron trifluoride and the complexing agent are added separately to the reactor.

The process of the present invention can be carried out batchwise or continuously. The reaction is suitably carried out in a boiling liquid at temperatures in the range from −40° C. to +40° C. The pressure in the reactor is preferably between 0.2 and 4.0 bar absolute.

The process of the present invention is suitable for producing polyisobutenes having a number average molecular weight preferably in the range from 350 to 5000, more preferably in the range 500 to 3000.

When the number average molecular weight is from 350 to 5000 the molecular weight distribution (weight average molecular weight divided by number average molecular weight) may range from 1.2 to 2.5, preferably from 1.0 to 2.0 and more preferably from 1.2 to 1.5.

BRIEF DESCRIPTION OF THE DRAWINGS

FIG. 4(b) is a GPC trace for one of the samples of Comparative Test 3.

Figure 1A:
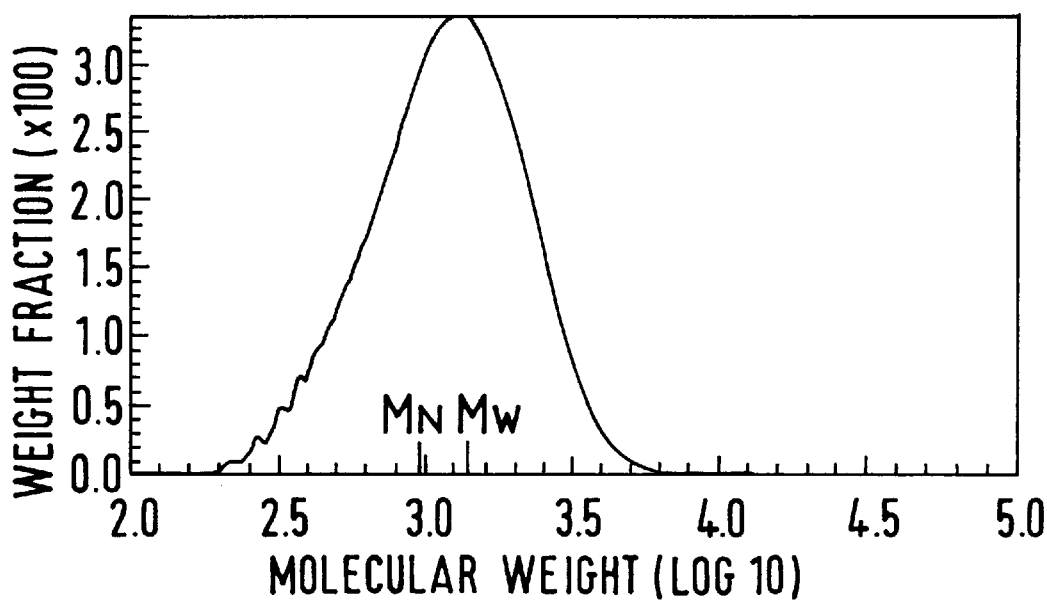
FIG. 1(a) is a GPC trace for one of the samples in Example 1.

The process of the present invention is further illustrated with reference to the following Examples:

EXAMPLE 1

Using a continuous stirred tank boiling liquid reactor provided with a condenser, a 1:1 molar complex of boron trifluoride and ethanol was used to carry out the continuous cationic polymerisation of a mixed carbon-4-hydroisomerised Raffinate I feedstream (from a steam cracker after the selective separation of 1,3-butadiene and containing between about 36 and 42% isobutene and between 3 and 5% butene-1) at a reaction temperature of −10° C. and a typical reaction residence time of between 15 and 25 minutes. The amount of pre-formed 1:1 boron trifluoride/ethanol complex added to the reactor was between 1.6 and 1.9 kg per tonne of hydroisomerised Raffinate I feedstock. At the same time, ethanol was added into the reactor overhead line to the condenser via a spray system. In order to ensure that the added ethanol ended up as evenly distributed over the vulnerable surface of the condenser as possible, the spray nozzles were of a sufficiently small size and the position of the spray nozzle was sufficiently far enough away from the condenser that it was calculated that virtually all of the added ethanol being added neat into the reactor overhead line via the spray system would vapourise and be carried to the condenser. The amount of ethanol added to the reactor was between 0.45 and 0.6 kg per tonne of hydroisomerised Raffinate I feedstock.

After the reaction was completed, an alkaline base which deactivates the boron trifluoride catalyst and hence terminates the polymerisation reaction was added to the crude reactor product. Following reaction termination, the crude deactivated product was cleaned by water washing in order to remove the deactivated boron trifluoride catalyst residues and excess alkaline base residues. Finally, the crude reaction product was distilled in order to remove light polymer. Some typical number average molecular weight (Mn) and weight average molecular weight (Mw) results (determined by gel chromatography using a polyisobutene standard which was calibrated by vapour pressure osmometry) for the polymer product prepared under the above reaction conditions are shown in table 2.

TABLE 2

| | GPC Data | | |
|---|---|---|---|
| Sample | Product Mn | Product Mw | Product Mol Wt Distribution Mw/Mn |
| 1 | 966 | 1392 | 1.44 |
| 2 | 1018 | 1471 | 1.44 |

Comparative Test 1 (not according to the invention)

Using the same reactor system as that employed in example 1 above, a 1:1 molar complex of boron trifluoride and ethanol was used to carry out the continuous cationic polymerisation of a mixed C4 hydroisomerised Raffinate I feedstream (from a steam cracker after the selective separation of 1,3-butadiene and containing between about 36 and 42% isobutene and between 3 and 5% butene-1) at a reaction temperature of −10° C. and a typical reaction residence time of between 15 and 25 minutes. The amount of pre-formed 1:1 boron trifluoride/ethanol complex added to the reactor was between 1.6 and 1.9 kg per tonne of hydroisomerised Raffinate I feedstock. At the same time, ethanol was added to the hydroisomerised Raffinate I feedstock prior to it entering the reactor below the reaction liquid level rather than added neat to the reactor via a spray system above the reaction liquid level. The amount of ethanol added to the reactor was between 0.45 and 0.6 kg per tonne of hydroisomerised Raffinate I.

After completion of the reaction, the polymerisation reaction was terminated and worked-up under the same conditions as those employed in example 1 above. Some typical number average molecular weight (Mn) and weight average molecular weight (Mw) results (determined by gel chromatography using a polyisobutene standard which was calibrated by vapour pressure osmometry) for the polymer product prepared under the above reaction conditions are shown in table 3.

TABLE 3

| | GPC Data | | |
|---|---|---|---|
| Sample | Product Mn | Product Mw | Product Mol Wt Distribution Mw/Mn |
| 1 | 925 | 1635 | 1.77 |
| 2 | 1181 | 1878 | 1.59 |

Figure 1B:
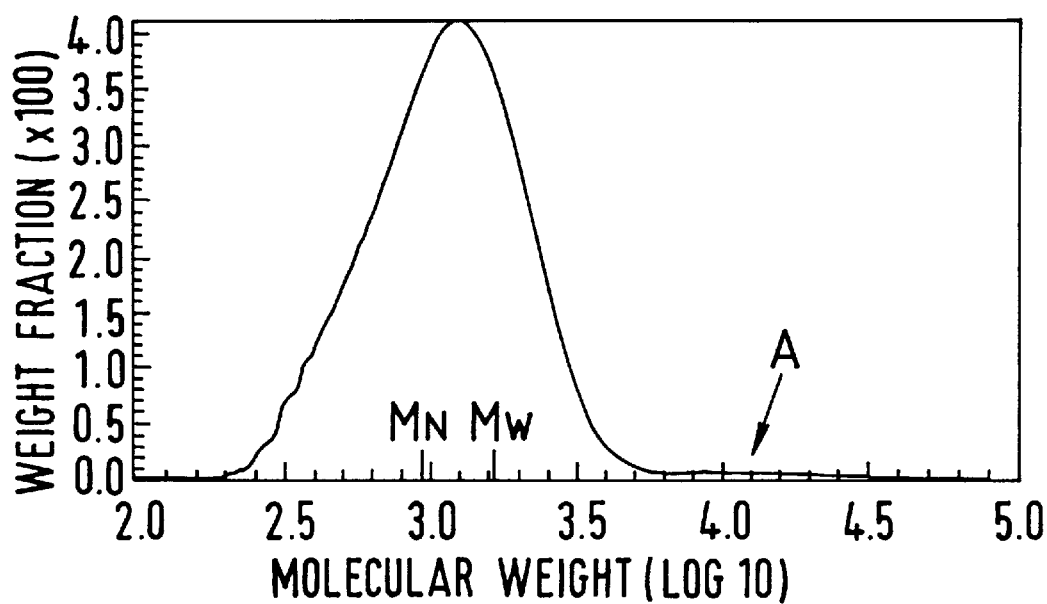
FIG. 1(b) is a GPC trace for one of the samples of Comparative Test 1.

The results highlighted in tables 2 and 3 demonstrate that the product molecular weight distribution was significantly narrower for the product made when a spray of ethanol was introduced into the reactor above the reaction liquid level in such a manner that it was able to cover the vulnerable surface of the condenser. This finding is further highlighted in FIGS. 1(a) and 1(b). FIG. 1(a) is a GPC trace for one of the samples of Example 1, i.e. for a polymer prepared when ethanol was added to the reactor via a spray system above the reaction liquid level. FIG. 1(b) is a GPC trace for one of the samples of Comparative Test 1, i.e. for a polymer prepared when ethanol was added to the feedstock prior to the feedstock entering the reactor below the reaction liquid level. In FIG. 1(a) Mn is 966, Mw is 1392 and Mw/Mn (the product molecular weight distribution) is 1.44. In FIG. 1(b) Mn is 925, Mw is 1635 and Mw/Mn is 1.77. It can be seen in FIG. 1(b) that a characteristic of the polymer product made when the ethanol was added to the feedstock was that it possessed a "high molecular weight tail", (A), and it can be seen in FIG. 1(a) that this characteristic is not present in the polymer sample prepared when the ethanol was introduced to the reactor above the reaction liquid level in such a manner that it was able to cover the vulnerable surface of the condenser.

EXAMPLE 2

Using a continuous stirred tank boiling liquid reactor provided with a condenser, a 1:1 molar complex of boron trifluoride and ethanol was used to carry out the continuous cationic polymerisation of a mixed carbon-4 Raffinate I feedstream (from a steam cracker after the selective separation of 1,3-butadiene and containing between about 36 and 42% isobutene) at a reaction temperature of −5° C. and a typical reaction residence time of between 15 and 25 minutes. The amount of pre-formed 1:1 boron trifluoride/ethanol complex added to the reactor was between 1.5 and 2.1 kg per tonne of Raffinate I feedstock. At the same time, 2-propanol was added into the reactor overhead line to the condenser via a spray system. In order to ensure that the added 2-propanol ended up as evenly distributed over the vulnerable surface of the condenser as possible, the spray nozzles were of a sufficiently small size and the position of the spray nozzle was sufficiently far enough away from the condenser that it was calculated that virtually all of the added 2-propanol being added neat into the reactor overhead line via the spray system would vapourise and be carried to the condenser. The amount of 2-propanol added to the reactor was between 0.24 and 0.34 kg per tonne of Raffinate I.

After the reaction was completed, an alkaline base which deactivates the boron trifluoride catalyst and hence terminates the polymerisation reaction was added to the crude reactor product. Following reaction termination, the crude deactivated reaction product was cleaned by water washing in order to remove the deactivated boron trifluoride catalyst residues and excess alkaline base residues. Finally, the crude reaction product was distilled in order to remove unreacted C4 monomers and then vacuum distilled in order to remove light polymer. Some typical number average molecular weight (Mn) and weight average molecular weight (Mw) results (determined by gel chromatography using a polyisobutene standard which was calibrated by vapour pressure osmometry) for the polymer product prepared under the above reaction conditions are shown in table 4 below.

TABLE 4

GPC Data

| Sample | Product Mn | Product Mw | Product Mol Wt Distribution Mw/Mn |
|---|---|---|---|
| 1 | 1135 | 1612 | 1.42 |
| 2 | 1039 | 1517 | 1.46 |

Comparative Test 2 (not according to the invention)

Using the same reactor system as that employed in Example 2 above, a 1:1 molar complex of boron trifluoride and ethanol was used to carry out the continuous cationic polymerisation of a mixed C4 Raffinate I feedstream (from a steam cracker after the selective separation of 1,3-butadiene and containing between about 36 and 42% isobutene) at a reaction temperature of −5° C. and a typical reaction residence time of between 15 and 25 minutes. The amount of preformed 1:1 boron trifluoride/ethanol complex added to the reactor was about 2.1 kg per tonne of Raffinate I feedstock. At the same time, 2-propanol was added to the Raffinate I feedstock prior to it entering the reactor below the reaction liquid level rather than added neat to the reactor via a spray system above the reaction liquid level. The amount of 2-propanol added to the reactor was about 0.4 kg per tonne of Raffinate I.

After completion of the reaction, the polymerisation reaction was terminated and worked-up under the same conditions as those employed in Example 2 above. Some typical number average molecular weight (Mn) and weight average molecular weight (Mw) results (determined by gel chromatography using a polyisobutene standard which was calibrated by vapour pressure osmometry) for the polymer product prepared under the above reaction conditions are shown in table 5.

TABLE 5

GPC Data

| Sample | Product Mn | Product Mw | Product Mol Wt Distribution Mw/Mn |
|---|---|---|---|
| 1 | 1027 | 1981 | 1.93 |
| 2 | 790 | 1406 | 1.78 |

Figure 2A:
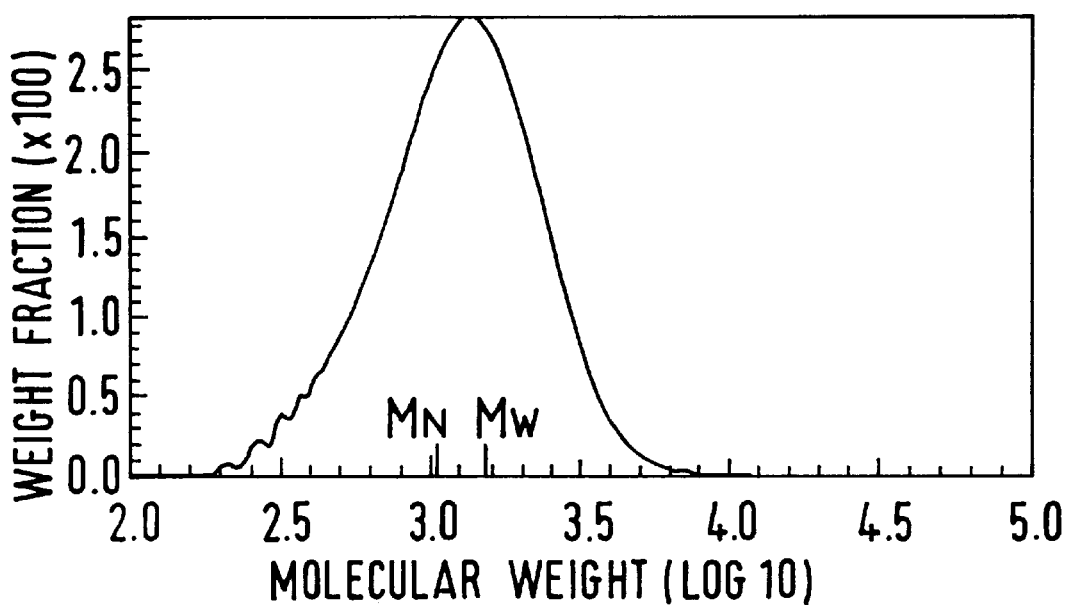
FIG. 2(a) is a GPC trace for one of the samples in Example 2.
Figure 2B:
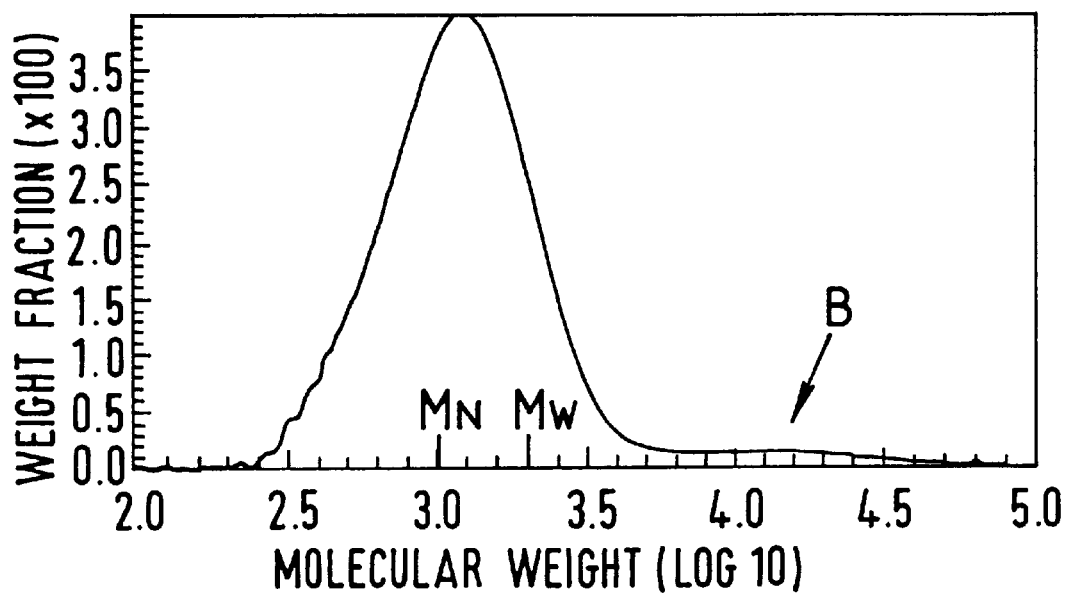
FIG. 2(b) is a GPC trace for one of the samples of Comparative Test 2.

The results highlighted in tables 4 and 5 demonstrate that the product molecular weight distribution was significantly narrower for the product made when a spray of 2-propanol was introduced into the reactor above the reaction liquid level in such a manner that it was able to cover the vulnerable surface of the condenser. This finding is further highlighted in FIGS. 2(a) and 2(b). FIG. 2(a) is a GPC trace for one of the samples of Example 2, i.e. for a polymer prepared when 2-propanol was added to the reactor via a spray system above the reaction liquid level. FIG. 2(b) is a GPC trace for one of the samples of Comparative Test 2, i.e. for a polymer prepared when 2-propanol was added to the feedstock prior to the feedstock entering the reactor below the reaction liquid level. In FIG. 2(a) Mn is 1039, Mw is 1517 and Mw/Mn is 1.46. In FIG. 2(b) Mn is 1027, Mw is 1981 and Mw/Mn is 1.93. It can be seen in FIG. 2(b) that a characteristic of the polymer product made when the 2-propanol was added to the feedstock was that it possessed a "high molecular weight tail", (B), and it can be seen in FIG. 2(a) that this characteristic is not present in the polymer sample prepared when the 2-propanol was introduced to the reactor above the reaction liquid level in such a manner that it was able to cover the vulnerable surface of the condenser.

EXAMPLE 3

Using a continuous stirred tank boiling liquid reactor, a 1:1 molar complex of boron trifluoride and ethanol was used to carry out the continuous cationic polymerisation of a mixed C4 Raffinate I feedstream (from a steam cracker after the selective separation of 1,3-butadiene and containing between about 36 and 42% isobutene) at a reaction temperature of −12° C. and a typical reaction residence time of between 15 and 20 minutes. The amount of pre-formed 1:1 boron trifluoride/ethanol complex added to the reactor was about 1.6 kg per tonne of Raffinate I feedstock. At the same time, 2-propanol was added neat into the reactor condenser via a spray system. In order to ensure that the added 2-propanol ended-up as evenly distributed over the vulnerable surface of the condenser as possible, the spray nozzles were of a sufficiently small size and the position of the spray nozzle was sufficiently far enough away from the condenser that it was calculated that virtually all of the added 2-propanol being fed neat into the reactor overhead line via the spray system would vapourise and be carried to the condenser. The amount of 2-propanol added via this spray system was about 0.34 kg per tonne of Raffinate I.

After completion of the reaction, an alkaline base which deactivates the boron trifluoride catalyst and hence terminates the polymerisation reaction was added to the crude reactor product. Following reaction termination, the crude deactivated reaction product was cleaned by water washing in order to remove the deactivated boron trifluoride catalyst residues and excess alkaline base residues. Finally, the crude reaction product was distilled in order to remove unreacted C4 monomers and then vacuum distilled in order to remove light polymer. The typical number average molecular weight (Mn) and weight average molecular weight (Mw) results (determined by gel chromatography using a polyisobutene standard which was calibrated by vapour pressure osmometry) for the polymer product prepared under the above reaction conditions are shown in table 6.

TABLE 6

GPC Data

| Product Mn | Product Mw | Product Mol Wt Distribution Mw/Mn |
|---|---|---|
| 1558 | 2243 | 1.44 |

Comparative Test 3 (not according to the invention)

Using the same reactor system as that employed in Example 2 above, a 1:1 molar complex of boron trifluoride and ethanol was used to carry out the continuous cationic polymerisation of a mixed C4 Raffinate I feedstream (from a steam cracker after the selective separation of 1,3- butadiene and containing between about 36 and 42% isobutene) at a reaction temperature of −12° C. and a typical reaction residence time of between 15 and 25 minutes. The amount of preformed 1:1 boron trifluoride/ethanol complex added to the reactor was about 1.4 kg per tonne of Raffinate I feedstock. At the same time, 2-propanol was added to the Raffinate I feedstock prior to it entering the reactor below the reaction liquid level. The amount of 2-propanol added to the reactor was about 0.3 kg per tonne of Raffinate I.

After the reaction was complete, the polymerisation reaction was terminated and worked-up under the same conditions as those employed in Example 2 above. The typical number average molecular weight (Mn) and weight average molecular weight (Mw) results (determined by gel chromatography using a polyisobutene standard which was calibrated by vapour pressure osmometry) for the polymer product prepared under the above reaction conditions are shown in table 7.

TABLE 7

| GPC Data | | |
|---|---|---|
| Product Mn | Product Mw | Product Mol Wt Distribution Mw/Mn |
| 1520 | 2376 | 1.56 |

Figure 3A:
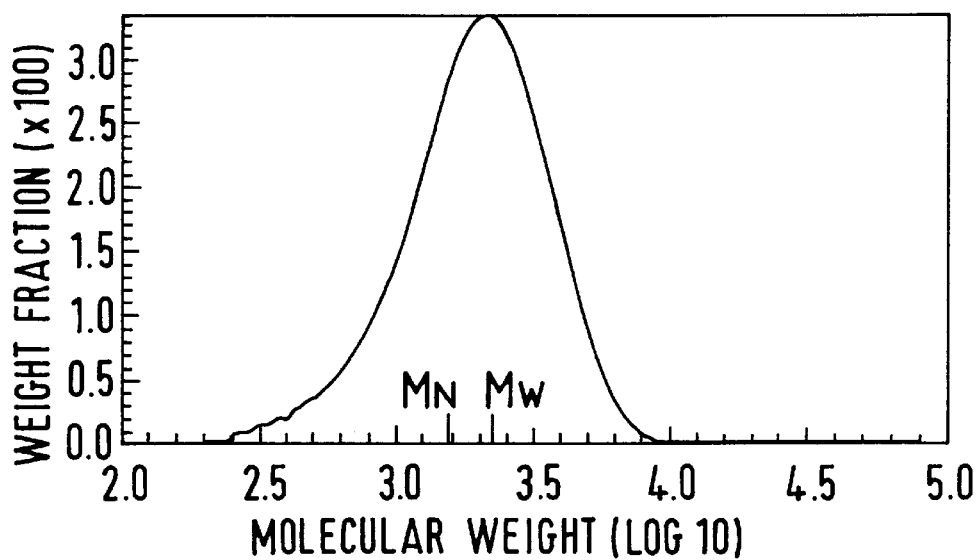
FIG. 3(a) is a GPC trace for one of the samples of Example 3.
Figure 3B:
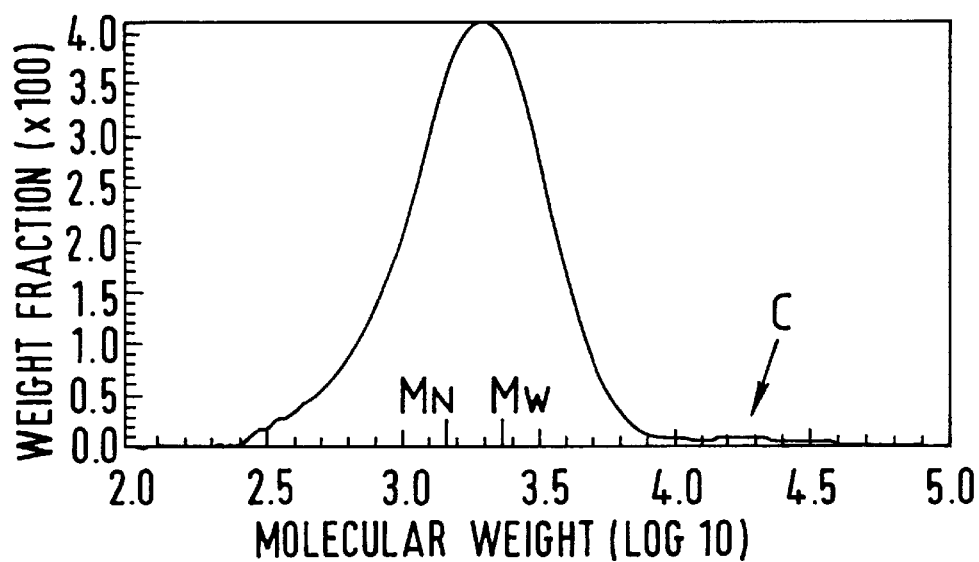

Once again, the results highlighted in tables 6 and 7 demonstrate that the dispersity index of the product was significantly narrower when the product made using 2-propanol introduced into the reactor above the reaction liquid level in such a manner that it was able to cover the vulnerable surface of the condenser. This finding is further highlighted in FIGS. 3(a) and 3(b). FIG. 3(a) is a GPC trace for one of the samples of Example 3, i.e. for a polymer prepared when 2-propanol was added to the reactor via a spray system above the reaction liquid level. FIG. 3(b) is a GPC trace for one of the samples of Comparative Test 3, i.e. for a polymer prepared when 2-propanol was added to the feedstock prior to the feedstock entering the reactor below the reaction liquid level. In FIG. 3(a) Mn is 1558, Mw is 2243 and Mw/Mn is 1.44. In FIG. 3(b) Mn is 1520, Mw is 2376 and Mw/Mn is 1.56. It can be seen in FIG. 3(b) that a characteristic of the polymer product made when the 2-propanol was added to the feedstock was that it possessed a "high molecular weight tail", (C), and it can be seen in FIG. 3(a) that this characteristic is not present in the polymer sample prepared when the 2-propanol was introduced to the reactor above the reaction liquid level in such a manner that it was able to cover the vulnerable surface of the condenser.

We claim:

1. A process for controlling the dispersity index of polymers formed during a liquid phase cationic polymerisation of a hydrocarbon feedstock comprising isobutene in the presence of a catalyst comprising boron trifluoride in a liquid phase in a reactor having condensers associated therewith, said process comprising introducing above the level of liquid in the reactor an electron donor to minimise the reaction of isobutene with free gaseous boron trifluoride in the condensers thereby minimising the formation of unwanted polymers.

2. A process according to claim 1 in which the electron donor is introduced above the reactor liquid level and distributed over the surface of the condenser(s).

3. A process according to claim 1 in which the amount of isobutene in the hydrocarbon feedstock is at least 10% w/w.

4. A process according to claim 1 of the preceding claims in which the donor is added into the reactor anywhere above the reactor liquid level via one or more nozzles.

5. A process according to claim 1 in which at least 2 moles of the electron donor per mole of free gaseous boron trifluoride expected to rise in the condensers and the associated pipe-work are added above the level of the liquid in the reactor.

6. A process according to claim 5 in which at least 3 moles of the electron donor per mole of free gaseous boron trifluoride expected to rise in the condensers and the associated pipe-work are added above the level of the liquid in the reactor.

7. A process according to claim 1 in which the electron donor is introduced into the reactor through a nozzle such that the droplets and/or vapours thereof reach and fully envelop the surface of the condenser(s) and associated pipe work without itself condensing and dropping down into the bulk reaction liquid prior to reaching the condenser(s).

8. A process according claim 1 in which the electron donor is one or more selected from the group of alcohols, straight, branched chain or cyclic ethers, esters, acids, aldehydes, ketones, amines, amides and amino-alcohols.

9. A process according to claim 8 in which the electron donor is a primary or a secondary alcohol.

10. A process according to claim 9 in which the electron donor is selected from methanol, ethanol, propanol, butanol, iso-propanol or 2-butanol.

11. A process according to claim 8 in which the electron donor is an alkyl tertiary-butyl ether.

12. A process according to claim 11 in which the electron donor is selected from methyl tertiary butyl ether, ethyl tertiary butyl ether, propyl tertiary butyl ether, butyl tertiary butyl ether, iso-propyl tertiary butyl ether or sec-butyl tertiary butyl ether.

13. A process according to claim 1 in which the polymer being formed has a number average molecular weight in the range 350 to 5000.

* * * * *